(12) United States Patent  
Yamaguchi

(10) Patent No.: US 12,190,517 B2
(45) Date of Patent: Jan. 7, 2025

(54) IMAGING ANALYSIS DEVICE AND IMAGING DATA ANALYSIS METHOD

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/768,404

(22) PCT Filed: Nov. 14, 2019

(86) PCT No.: PCT/JP2019/044766
§ 371 (c)(1),
(2) Date: Apr. 12, 2022

(87) PCT Pub. No.: WO2021/095210
PCT Pub. Date: May 20, 2021

(65) Prior Publication Data
US 2024/0153086 A1 May 9, 2024

(51) Int. Cl.
*G06T 7/00* (2017.01)
(52) U.S. Cl.
CPC .. *G06T 7/0014* (2013.01); *G06T 2207/10048* (2013.01); *G06T 2207/10056* (2013.01);
(Continued)
(58) Field of Classification Search
CPC ............... G01N 21/65; G01N 27/62; G06T 2207/10048; G06T 2207/10056;
(Continued)

(56) References Cited

U.S. PATENT DOCUMENTS

2002/0067858 A1* 6/2002 Lazaridis ............ G06T 7/0012
382/228
2003/0130823 A1* 7/2003 Potyrailo .............. G01J 3/28
702/189
(Continued)

FOREIGN PATENT DOCUMENTS

JP 2018-017743 A 2/2018
WO 2017/002226 A1 1/2017

OTHER PUBLICATIONS

Eva Gorrochategui,"Data analysis strategies for targeted and untargeted LC-MS metabolomic studies: Overview and workflow," Jul. 27, 2016, Trends in Analytical Chemistry 82 (2016),pp. 425-437.*
(Continued)

*Primary Examiner* — Omar S Ismail
(74) *Attorney, Agent, or Firm* — Sughrue Mion, PLLC

(57) ABSTRACT

An imaging analysis device according to the present invention includes: an analysis execution unit (1) configured to perform analysis by a predetermined analysis method for each of a plurality of measurement points set in a measurement area on a sample and collect imaging data; a reference image acquiring unit (2) configured to acquire a reference image for the measurement area; a regression analysis executer (36) configured to, with respect to the imaging data and the reference image obtained for the same sample, perform predetermined regression analysis calculation with the imaging data as an explanatory variable and data constituting the reference image as a target variable and acquire a regression model; and a predicted image creator (37) configured to apply, to the regression model, imaging data obtained by the analysis execution unit using a sample different from the sample used in the regression analysis executer, and create a predicted image based on a pseudo regression analysis result.

8 Claims, 2 Drawing Sheets

(52) U.S. Cl.
CPC ........... *G06T 2207/10064* (2013.01); *G06T 2207/30024* (2013.01)

(58) Field of Classification Search
CPC . G06T 2207/10064; G06T 2207/30024; G06T 7/0014; H01J 49/16
See application file for complete search history.

(56) References Cited

U.S. PATENT DOCUMENTS

| | | | | |
|---|---|---|---|---|
| 2014/0193060 | A1* | 7/2014 | Tanji | G06T 7/0014 382/133 |
| 2015/0131888 | A1* | 5/2015 | Caprioli | G06F 18/28 382/133 |
| 2016/0034809 | A1* | 2/2016 | Trenholm | G06F 18/214 706/20 |
| 2016/0266126 | A1* | 9/2016 | Shipitsin | G06T 7/11 |
| 2018/0045622 | A1* | 2/2018 | Deisseroth | G01N 33/4833 |
| 2018/0197726 | A1 | 7/2018 | Yamaguchi | |
| 2019/0033210 | A1* | 1/2019 | Yarden | B07C 5/342 |
| 2019/0072559 | A1* | 3/2019 | Gu | C07D 209/16 |
| 2019/0272438 | A1* | 9/2019 | Liu | G06N 3/045 |
| 2023/0343137 | A1* | 10/2023 | Sun | G06T 5/73 |

OTHER PUBLICATIONS

Sevgi Türker-Kaya,"A Review of Mid-Infrared and Near-Infrared Imaging:Principles, Concepts and Applications in Plant Tissue Analysis," Jan. 20, 2017, Molecules 2017, 22, 168; doi:10.3390/molecules22010168,pp. 1-13.*

Jiuming He et al.,"MassImager: A software for interactive and in-depth analysis of mass spectrometry imaging data," Feb. 20, 2018, Analytica Chimica Acta 1015 (2018),pp. 51-55.*

Anna Nilsson et al. , "Fine Mapping the Spatial Distribution and Concentration of Unlabeled Drugs within Tissue Micro-Compartments Using Imaging Mass Spectrometry," Jul. 14, 2010,PLoS One,www.plosone.org, Jul. 2010,vol. 5,Issue 7,pp. 1-7.*

Ivo Klinkert et al. , "Methods for full resolution data exploration and visualization forlarge 2D and 3D mass spectrometry imaging datasets,"Dec. 24, 2013, International Journal of Mass Spectrometry 362 (2014),pp. 41-46.*

Tomáš Pluskal et al.,"MZmine 2: Modular framework for processing, visualizing, and analyzing mass spectrometrybased molecular profile data," Jul. 23, 2010, BMC Bioinformatics 2010,vol. 11,Article No. 395,pp. 1-9.*

Ralf Weiskirchen et al. , "Software solutions for evaluation and visualization of laser ablation inductively coupled plasma mass spectrometry imaging (LA-ICP-MSI) data: a short overview," Feb. 18, 2019, Journal of Cheminformatics,vol. 11, article No. 16, (2019),pp. 1,9-17.*

"Imagereveal™ MS Simplifies and Controls Data Analysis in Mass Spectrometry Imaging", [online], Shimadzu Corporation, [searched on Jul. 3, 2019].

International Search Report for PCT/JP2019/044766 dated Feb. 4, 2020 [PCT/ISA/210].

Written Opinion for PCT/JP2019/044766 dated Feb. 4, 2020 [PCT/ISA/237].

* cited by examiner

IMAGING ANALYSIS DEVICE AND IMAGING DATA ANALYSIS METHOD

CROSS REFERENCE TO RELATED APPLICATIONS

This application is a National Stage of International Application No. PCT/JP2019/044766 filed Nov. 14, 2019.

TECHNICAL FIELD

The present invention relates to an imaging analysis device such as an imaging mass spectrometer, and an analysis method for performing analysis processing using imaging data in the imaging analysis device.

BACKGROUND ART

An imaging mass spectrometer is a device capable of measuring a two-dimensional intensity distribution of ions having a specific mass-to-charge ratio m/z on the surface of a sample such as a piece of biological tissue, while observing the surface morphology of the same sample with an optical microscope. By using the imaging mass spectrometer to observe a two-dimensional intensity distribution image (mass spectrometric (MS) image) of ions derived from a compound characteristically appearing in a specific disease such as cancer, it is possible to grasp the breadth of the disease. For this reason, in recent years, studies have been actively conducted using imaging mass spectrometers to analyze the pharmacokinetics on a piece of biological tissue or the like or analyze the difference in the distribution of a compound in organs, the difference in the distribution of a compound between a pathological site of cancer or the like and a normal site, or the like.

In the imaging mass spectrometer, mass spectral data indicating signal intensity over a wide mass-to-charge ratio range is obtained at each of a large number of measurement points on a sample. Therefore, the amount of data obtained for one sample is enormous, and multivariate analysis is widely used to extract significant information from the enormous data.

For example, Non Patent Literature 1 discloses data analysis software having a function of comparing a reference image such as a stained image of a sample such as a piece of biological tissue with MS images each showing a signal intensity distribution at each mass-to-charge ratio m/z obtained by an imaging mass spectrometer, extracting a mass-to-charge ratio showing a two-dimensional distribution similar to the reference image, and displaying the MS image at the extracted mass-to-charge ratio. In order to search for a similar image, as described in Patent Literature 1 and the like, it is possible to use partial least square (PLS) regression using data constituting the reference image as a target variable Y and the mass spectrometry imaging data as an explanatory variable X.

In the above-described PLS regression in imaging mass spectrometry, a regression coefficient (PLS score) is calculated for each parameter of the explanatory variable X, that is, for each mass-to-charge ratio of mass imaging data, and a regression coefficient matrix is obtained. Then, for each measurement point within the two-dimensional range on the sample to be subjected to the imaging mass spectrometry, a model image can be created on the basis of the result of multiplying the signal intensity value at each mass-to-charge ratio by the regression coefficient corresponding to the mass-to-charge ratio, and the image can be displayed on a screen of a display unit. This model image is a distribution image from which an error (residual) in the PLS regression has been removed, and when the regression has been performed well, the model image accurately represents the distribution of the tissue (specific diseased tissue or the like) of interest to the user, for example.

CITATION LIST

Patent Literature

Patent Literature 1: WO 2017/002226 A

Non Patent Literature

Non Patent Literature 1: "IMAGEREVEAL™ MS Simplifies and Controls Data Analysis in Mass Spectrometry Imaging", [online], Shimadzu Corporation, [searched on Jul. 3, 2019], Internet

SUMMARY OF INVENTION

Technical Problem

In the conventional data analysis software or the imaging mass spectrometer using such software, the PLS regression cannot be performed unless a reference image such as a stained image (i.e., an optical image) in the same range as the MS image is obtained, and hence the model image cannot be calculated. However, in a case where analysis should be performed on a large number of samples, it is very troublesome and time-consuming to perform imaging mass spectrometry and optical image acquisition in the same two-dimensional range for each of the samples.

Such a problem arises not only in the imaging mass spectrometer but also commonly in imaging analysis devices using various measurement methods such as a Raman spectroscopic imaging method, a fluorescence imaging method, and a Fourier transform infrared spectroscopy (FTIR) imaging method.

The present invention has been made to solve the above problems, and an object of the present invention is to provide an imaging analysis device and an imaging data analysis method capable of creating an accurate model image even when a reference image for a two-dimensional range on a sample subjected to imaging analysis such as imaging mass spectrometry cannot be prepared.

Solution to Problem

An aspect of an imaging analysis device according to the present invention made to solve the above problems includes:
- an analysis execution unit configured to perform analysis by a predetermined analysis method for each of a plurality of measurement points set in a measurement area on a sample and collect imaging data;
- a reference image acquiring unit configured to acquire a reference image for the measurement area;
- a regression analysis executer configured to, with respect to the imaging data and the reference image obtained for the same sample, perform predetermined regression analysis calculation with the imaging data as an explanatory variable and data constituting the reference image as a target variable and acquire a regression model; and a predicted image creator configured to apply, to the regression model, imaging data obtained by the analysis execution unit using a sample different from the sample used in the regression analysis executer, and create a predicted image based on a pseudo regression analysis result.

An aspect of an imaging data analysis method according to the present invention made to solve the above problems includes:

an analysis execution step for performing analysis by a predetermined analysis method for each of a plurality of measurement points set in a measurement area on a sample and collecting imaging data;

a reference image acquisition step for acquiring a reference image for the measurement area;

a regression analysis execution step for, with respect to the imaging data and the reference image obtained for the same sample, performing predetermined regression analysis calculation with the imaging data as an explanatory variable and data constituting the reference image as a target variable and acquiring a regression model; and a predicted image creation step for applying, to the regression model, imaging data obtained by the analysis execution step using a sample different from the sample used at a time of execution of the regression analysis in the regression analysis execution step, and creating a predicted image based on a pseudo regression analysis result.

The predetermined analysis method is mass spectrometry, Raman spectroscopy, infrared spectroscopy (including Fourier transform infrared spectroscopy), fluorescence spectroscopy, or the like. The reference image can be an image obtained by performing analysis on a sample by one analysis method different from the analysis method selected as the predetermined measurement method among the above-described analysis methods. Further, the reference image may be an image obtained using a normal optical microscope.

Advantageous Effects of Invention

As an example, it is assumed that the predetermined analysis method is mass spectrometry, and the reference image is an optical image of the measurement area on the sample. This optical image corresponds to a purpose of analysis or the like and can be, for example, a stained image obtained by staining a substance related to a specific diseased tissue.

In the above aspect of the imaging analysis device according to the present invention, the regression analysis executer performs regression analysis with mass spectrometry imaging data for a certain sample as an explanatory variable and image data constituting an optical image (reference image) for the same measurement area of the same sample as a target variable, calculates a regression coefficient for each mass-to-charge ratio to acquire a regression model, and stores the regression model. When mass spectrometry imaging data is obtained by performing analysis on a sample for which a reference image has not been obtained by the analysis execution unit, the predicted image creator applies the mass spectrometry imaging data to the regression model, thereby performing a pseudo regression analysis, that is, arithmetic processing that can obtain a result substantially equivalent to the result of actually performing the regression analysis, and creating a predicted image when regression is performed accurately.

According to the one aspect of the imaging analysis device according to the present invention and the one aspect of the imaging data analysis method according to the present invention, even when there is no reference image for a target sample of an object to be analyzed, a model image close to that obtained by performing regression analysis from imaging data for the target sample can be created using a regression model created by use of another sample. As a result, by creating an accurate regression model, it is possible to obtain information such as a distribution of biological tissue having a high possibility of a specific lesion such as cancer, for example, on the basis of the imaging data for the target sample.

DESCRIPTION OF EMBODIMENTS

An imaging mass spectrometer that is one embodiment of an imaging analysis device according to the present invention will be described with reference to the accompanying drawings.

[Configuration of Imaging Mass Spectrometer of Present Embodiment]

Figure 1:
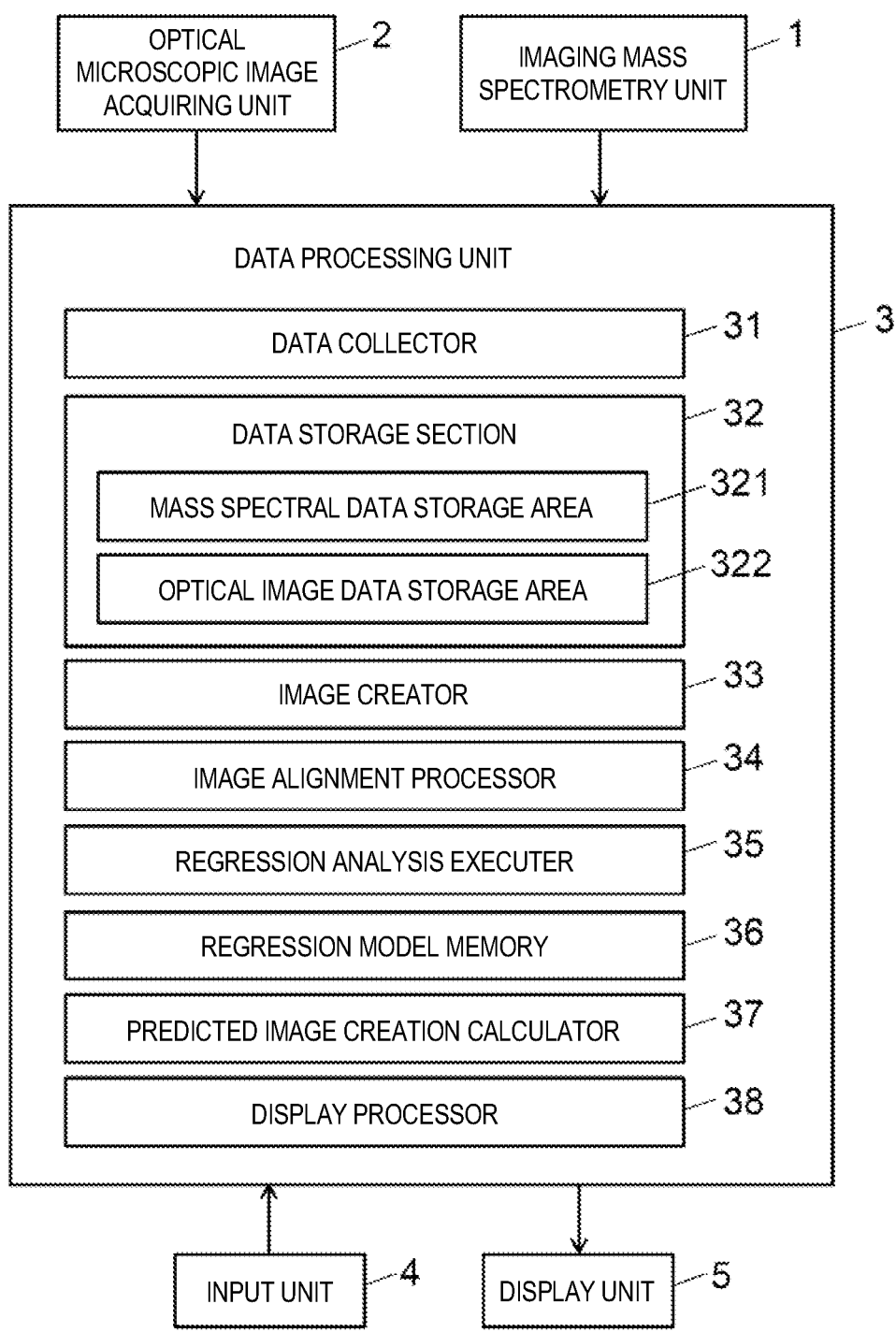
FIG. 1 is a schematic configuration diagram of an imaging mass spectrometer that is one embodiment of an imaging analysis device according to the present invention.

FIG. 1 is a schematic configuration diagram of the imaging mass spectrometer of the present embodiment.

This imaging mass spectrometer includes an imaging mass spectrometry unit 1 for performing analysis on a sample by imaging mass spectrometry, an optical microscopic image acquiring unit 2 for acquiring an optical image (fluorescence image) on the sample, a data processing unit 3, and an input unit 4 and a display unit 5 which are user interfaces.

The imaging mass spectrometry unit 1 includes, for example, a matrix-assisted laser desorption/ionization (MALD) ion trap time-of-flight mass spectrometer, and performs mass spectrometry on many measurement points (minute areas) in a two-dimensional measurement area on a sample such as a piece of biological tissue to acquire mass spectrometric data for each measurement point. In the following description, the mass spectrometric data is mass spectral data within a predetermined mass-to-charge ratio range but may be $MS^n$ spectral (product ion scan) data for a specific precursor ion. The optical microscopic image acquiring unit 2 is formed by adding an image acquiring unit to an optical microscope, and acquires an optical image of a two-dimensional area of the surface on a sample.

The data processing unit 3 receives mass spectral data at each measurement point collected by the imaging mass spectrometry unit 1 and optical image data input from the optical microscopic image acquiring unit 2 and performs predetermined processing. The data processing unit 3 includes a data collector 31, a data storage section 32, an image creator 33, an image alignment processor 34, a regression analysis executer 35, a regression model memory 36, a predicted image creation calculator 37, a display processor 38, and the like as functional blocks. The data storage section 32 includes a spectral data storage area 321 for storing data collected in measurement by the imaging mass spectrometry unit 1, and an optical image data storage area 322 for storing optical image data collected in measurement (image acquisition) by the optical microscopic image acquiring unit 2.

Note that the substance of the data processing unit 3 is usually a personal computer (or a higher-performance workstation), and the function of each of the above functional blocks can be achieved by operating, on the computer, dedicated software installed on the computer. In this case, the input unit 4 is a pointing device such as a keyboard or a mouse, and the display unit 5 is a display monitor.

[Operation of Imaging Mass Spectrometer of Present Embodiment]

Figure 2:
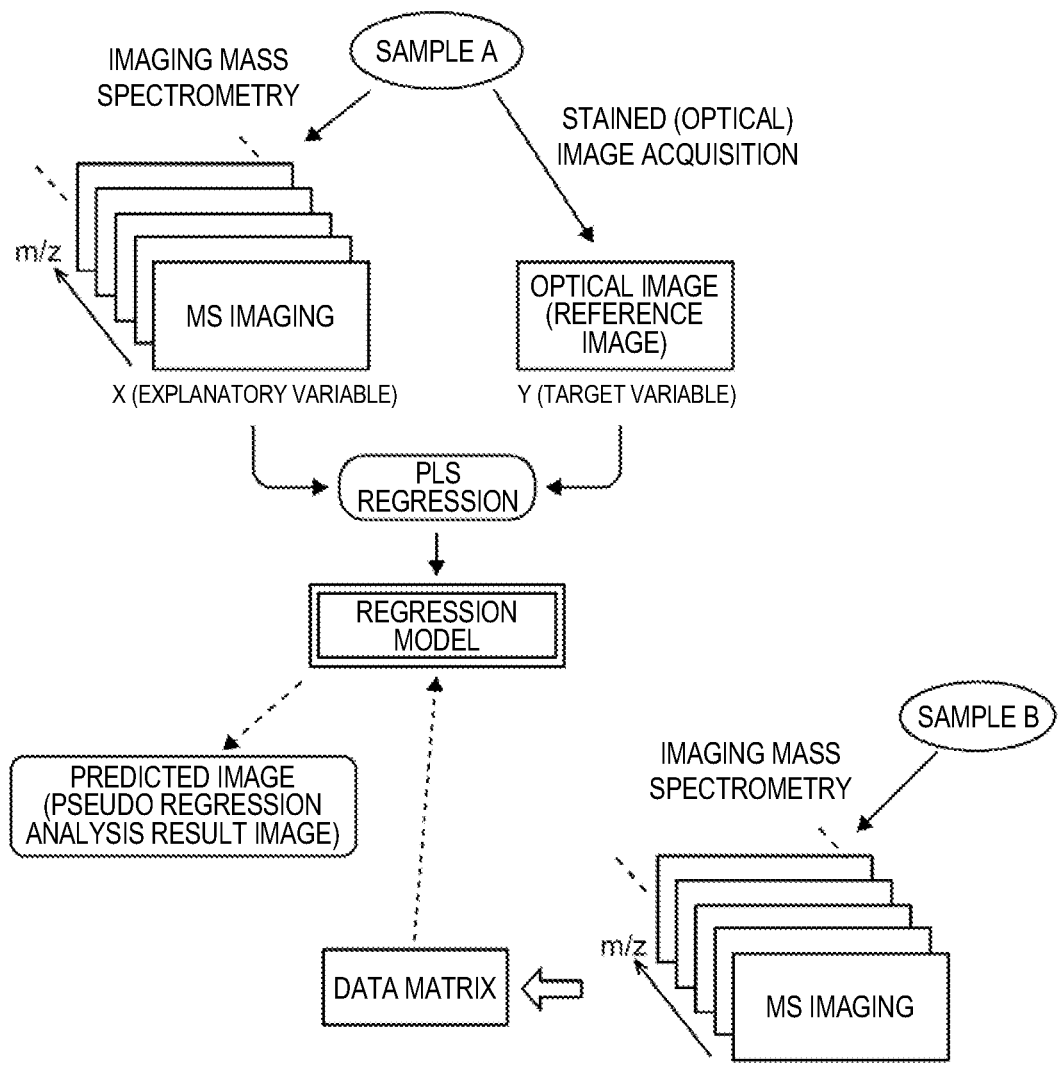
FIG. 2 is a schematic diagram of data processing performed in the imaging mass spectrometer of the present embodiment.

Next, sample analysis work and analysis work based on the result of the sample analysis work in the imaging mass spectrometer of the present embodiment will be described with reference to FIG. 2. Here, the sample to be analyzed is assumed to be, for example, a piece of a specific biological tissue such as an organ or a brain extracted from a laboratory animal. At the time of performing the same type of analysis on a large number of samples that are pieces of the same biological tissue extracted from different living bodies (individuals), first, a regression model to be described later is created on the basis of a result of performing analysis on any one sample (hereinafter referred to as Sample A).

The procedure for creating this regression model is as follows.

An operator sets Sample A at a predetermined measurement position of the optical microscopic image acquiring unit 2 and performs a predetermined operation on the input unit 4. In response to this, the optical microscopic image acquiring unit 2 acquires an image of the surface of Sample A and stores optical microscopic image data into the optical image data storage area 322. Further, the image creator 33 creates an optical image, and the display processor 38 causes the image to be displayed on the screen of the display unit 5. The operator instructs the whole sample or a measurement area, which is a part of the sample, on the image with the input unit 4.

The operator takes Sample A out of the device once and attaches a matrix for MALDI to the surface of Sample A. Then, Sample A to which the matrix has been attached is set at a predetermined measurement position of the imaging mass spectrometry unit 1, and a predetermined operation is performed by the input unit 4. Thus, the imaging mass spectrometry unit 1 performs mass spectrometry on many measurement points in the measurement area instructed as described above on Sample A, and acquires mass spectrometric data within a predetermined mass-to-charge ratio range. At this time, the data collector 31 performs so-called profile acquisition, collects profile spectral data, which is a waveform continuous in the direction of the mass-to-charge ratio within the predetermined mass-to-charge ratio range, and stores the collected data into the spectral data storage area 321 of the data storage section 32.

Note that in a case where a pattern (boundaries of different organizations, etc.) on the sample surface can be observed relatively clearly even when the matrix is attached to the sample surface, the image acquisition may be performed by the optical microscopic image acquiring unit 2 after the matrix is attached to the sample surface.

While the mass spectrometry imaging data and the optical image data for Sample A are stored in the data storage section 32 described above, the data processing is performed as follows.

The image creator 33 reads profile data on Sample A from the spectral data storage area 321 of the data storage section 32, calculates signal intensities at a plurality of predetermined target mass-to-charge ratios for each measurement point, and creates an MS image showing a two-dimensional distribution of signal intensities for each mass-to-charge ratio.

Specifically, the image creator 33 creates a profile spectrum from the profile data, detects a peak on the profile spectrum, and performs centroid conversion processing on each detected peak to obtain an accurate peak position (mass-to-charge ratio value). Then, when the mass-to-charge ratio value of the centroid peak is within a predetermined mass-to-charge ratio range with the specified mass-to-charge ratio as the center, the centroid peak is regarded as a peak corresponding to the target mass-to-charge ratio. Moreover, the image creator 33 integrates signal intensity values within a predetermined mass-to-charge ratio range (the range of the mass accuracy degree of the mass spectrometer) with the centroid peak as the center in the profile spectrum to obtain the integrated value as a signal intensity value with respect to the target mass-to-charge ratio. The two-dimensional distribution of the signal intensity value at the target mass-to-charge ratio can be obtained by performing similar processing on the profile data in each minute area, so that the MS image at one target mass-to-charge ratio can be obtained by creating an image of the obtained two-dimensional distribution.

The image creator 33 reads the optical image data on the same sample from the optical image data storage area 322 of the data storage section 32 and creates one optical image. In general, the spatial resolution of the optical microscopic image acquiring unit 2 is usually determined by the resolution of an image acquiring camera, while the resolution of the MS image is determined by the spot diameter of a laser beam applied onto the sample for ionization. Hence the resolution of MS images is often lower than the resolution of the optical image. Therefore, when the spatial resolution of the optical image is different from that of the MS image, the image alignment processor 34 performs resolution adjustment processing to equalize the spatial resolutions.

A simple method of equalizing the resolutions is a method of reducing the resolution of an image with a higher resolution to match an image with a lower resolution. As such a method, for example, binning processing is useful. Further, the resolution of the image with a lower resolution may be increased to match the image with a higher resolution. For this purpose, up-sampling processing is performed on the image with a lower resolution to apparently match the number of pixels, and thereafter, a pixel value of a pixel newly inserted by the up-sampling is calculated and filled by interpolation processing using a plurality of pixel values adjacent to or close to a certain pixel.

After the spatial resolution is equalized, the image alignment processor 34 appropriately deforms the optical image or the MS image so that the positions of the MS image and the optical image are approximately equalized in pixel units. Specifically, for example, the MS image is enlarged, reduced, rotated, moved, and further deformed in accordance with a predetermined algorithm with respect to the optical image as a reference, so that the positional relationship between the two images on the sample is matched approximately. By such processing, pixels at the same two-dimensional positions can be associated between the optical image and the MS image. The optical image processed in this manner is used as a reference image. Note that instead of using the optical image as it is, a two-dimensional distribution image of a luminance value of a specific color component specified in advance or selected as a result of automatic processing, the image having been created by extracting the color component from the optical image, may be used as the reference image.

Then, the regression analysis executer 35 performs PLS regression calculation, using as an explanatory variable X a matrix which has a signal intensity value for each mass-to-charge ratio value in each pixel as an element and has been created from data constituting the MS image after the processing, and using as a target variable Y a matrix which has a luminance value for each pixel as an element and has also been created from the reference image. The PLS regression is a known statistical analysis method and can be calculated using various types of generally available software, and hence a detailed description of the PLS regression will be omitted. The PLS regression enables the calculation of a parameter of the explanatory variable X, that is, a regression coefficient for each mass-to-charge ratio can be calculated. The relationship between the target variable Y and the explanatory variable X is expressed by the following regression equation (regression model).

$$Y = B_{pls} \cdot X + B_0 \quad (1)$$

$B_{pls}$ in Equation (1) is a regression coefficient matrix. Further, $B_0$ is an error (residual) generated in the regression, and the higher the certainty of approximation in the linear regression equation, the smaller the residual.

The regression analysis executer 35 stores the regression model or the regression coefficient matrix, calculated as described above, into the regression model memory 36. Further, when the regression model is obtained, the predicted image creation calculator 37 applies the regression model to the explanatory variable X, that is, a signal intensity value for each mass-to-charge ratio value in each pixel of the mass spectrometry imaging data and creates a predicted image based on the regression analysis result. This predicted image is an image obtained by Equation (2) below obtained by removing the residual $B_0$ in Equation (1).

$$Y' = B_{pls} \cdot X \quad (2)$$

When the accuracy of the regression model is high, that is, when the regression model well explains the target variable on the basis of the explanatory variable, the two-dimensional distribution of a predicted image Y' is similar to the two-dimensional distribution of a reference image Y.

The following processing is performed for target samples except for Sample A. Similarly to Sample A, the operator also performs mass spectrometry on Sample B at each of a large number of measurement points within a predetermined measurement area on the sample to acquire mass spectrometric data over a predetermined mass-to-charge ratio range. Then, the mass spectrometry imaging data is collected by performing the data processing as described above on the obtained profile spectral data. Note that the optical microscopic image acquiring unit 2 does not acquire an image of Sample B, and hence there is no optical image data.

The predicted image creation calculator 37 uses, as an explanatory variable X, a matrix having, as an element, a signal intensity value for each mass-to-charge ratio value in each pixel, created on the basis of the data constituting the MS image in Sample B after the above processing, and creates a predicted image by applying the regression model stored in the regression model memory 36 to the matrix. This can be regarded as a pseudo PLS regression analysis using a regression model created on the basis of another sample.

In order to create a predicted image for a certain sample, it is desirable to originally use a regression model obtained by performing PLS regression from a reference image and mass spectrometry imaging data obtained for the sample. However, under the condition that analysis for the same purpose (e.g., estimation of cancer tissue of the same type) is performed for the same biological tissue of the same type of living body (e.g., a laboratory animal of the same type), even when a regression model created for a certain sample is diverted to another sample, a substantially accurate predicted image can be obtained. The display processor 38 causes the thus-created predicted image for each sample to be displayed on the screen of the display unit 5, for example, in a list or individually.

As described above, in the imaging mass spectrometer of the present embodiment, even when the reference image has not been obtained, or even when the calculation processing of the regression coefficient by the PLS regression analysis is not actually performed, it is possible to create a predicted image as a pseudo regression analysis result on the basis of the mass spectrometry imaging data and present the predicted image to the operator. Therefore, it is possible to save time and labor for acquiring the reference image and to save time for performing the calculation processing of the PLS regression.

Further, a plurality of types of reference images can be acquired for one sample, and a different regression model can be created corresponding to each of the plurality of types of reference images. For example, by creating regression models corresponding to different diseases and lesions occurring in the same biological tissue, it is possible to create a plurality of predicted images corresponding to different diseases and lesions from a single sample.

Further, when the reference image is a color image, the color can be separated into three primary color components of light to obtain a reference image of three different color components. Since the two-dimensional distributions in the three types of reference images should be different from each other, a regression model may be obtained for each of the three types of reference images by the procedure described above, and the regression model may be stored in the regression model memory 36. In this way, the accuracy of the predicted image can be improved by obtaining a plurality of regression models from a reference image originally having one color, creating a predicted image for each regression model, and integrating the predicted images to obtain one predicted image.

Further, although the imaging mass spectrometer of the above embodiment has used the optical microscopic image as the reference image, an image obtained by other measurement methods except for the imaging mass spectrometry for the same sample, for example, Raman spectroscopic imaging, infrared spectroscopic imaging, X-ray analytical imaging, surface analytical imaging using a particle beam such as an electron beam or an ion beam, surface analytical imaging using a probe such as a scanning probe microscope (SPM), or the like may be used as the reference image.

Further, the PLS regression can also be performed using, as an explanatory variable, data such as Raman spectral data and infrared spectral data for each measurement point within the measurement area obtained by a Raman spectroscopic imaging method, an infrared spectroscopic imaging method, or the like. That is, the present invention can also be applied to a Raman spectroscopic imaging device, an infrared spectroscopic imaging device, a fluorescence spectroscopic imaging device, or the like, instead of the imaging mass spectrometer.

Further, the above embodiment is merely an example of the present invention, and it is natural that, even when modification, correction, and addition are made as appropriate in the scope of the gist of the present invention in addition to the various modifications described above, those are included in the claims of the present application.

[Various Aspects]

One embodiment in the present invention has been described above with reference to the accompanying drawings, and lastly, various aspects of the present invention will be described.

(First Clause) An aspect of an imaging analysis device according to the present invention includes:

an analysis execution unit configured to perform analysis by a predetermined analysis method for each of a plurality of measurement points set in a measurement area on a sample and collect imaging data;

a reference image acquiring unit configured to acquire a reference image for the measurement area;

a regression analysis executer configured to, with respect to the imaging data and the reference image obtained for the same sample, perform predetermined regression analysis calculation with the imaging data as an explanatory variable and data constituting the reference image as a target variable and acquire a regression model; and a predicted image creator configured to apply, to the regression model, imaging data obtained by the analysis execution unit using a sample different from the sample used in the regression analysis executer, and create a predicted image based on a pseudo regression analysis result.

(Fifth Clause) An aspect of an imaging data analysis method according to the present invention includes:

an analysis execution step for performing analysis by a predetermined analysis method for each of a plurality of measurement points set in a measurement area on a sample and collecting imaging data;

a reference image acquisition step for acquiring a reference image for the measurement area;

a regression analysis execution step for, with respect to the imaging data and the reference image obtained for the same sample, performing predetermined regression analysis calculation with the imaging data as an explanatory variable and data constituting the reference image as a target variable and acquiring a regression model; and a predicted image creation step for applying, to the regression model, imaging data obtained by the analysis execution step using a sample different from the sample used at a time of execution of the regression analysis in the regression analysis execution step, and creating a predicted image based on a pseudo regression analysis result.

According to the imaging analysis device of the first clause and the imaging data analysis method of the fifth clause, even when there is no reference image for a target sample of an object to be analyzed, a model image close to that obtained by performing regression analysis from imaging data for the target sample can be created using a regression model created by use of another sample. As a result, by creating an accurate regression model, it is possible to obtain information such as a distribution of biological tissue having a high possibility of a specific lesion such as cancer, for example, on the basis of the imaging data for the target sample.

(Second Clause) In the imaging analysis device according to the first clause, the analysis method can be mass spectrometry, and the imaging data can be mass spectral data in a predetermined mass-to-charge ratio range obtained for each of the measurement points.

(Sixth Clause) Further, in the imaging data analysis method according to the fifth clause, the analysis method can be mass spectrometry, and the imaging data can be mass spectral data in a predetermined mass-to-charge ratio range obtained for each of the measurement points.

(Third Clause) In the imaging analysis device according to the first clause, the analysis method can be Raman spectroscopy or infrared spectroscopy, and the imaging data can be spectral data in a predetermined wavelength range or wavenumber range obtained for each of the measurement points.

(Seventh Clause) In the imaging data analysis method according to the fifth clause, the analysis method can be Raman spectroscopy or infrared spectroscopy, and the imaging data can be spectral data in a predetermined wavelength range or wavenumber range obtained for each of the measurement points.

(Fourth Clause) In the imaging analysis device according to the first clause, the regression analysis can be a partial least squares regression analysis.

(Eighth Clause) Furthermore, in the imaging data analysis method according to the fifth clause, the regression analysis can be a partial least squares regression analysis.

According to the imaging analysis device of the fourth clause and the imaging data analysis method of the eighth clause, it is possible to perform favorable regression and create a predicted image with low residual and high accuracy.

REFERENCE SIGNS LIST

1 . . . Imaging Mass Spectrometry Unit
2 . . . Optical Microscopic Image Acquiring Unit
3 . . . Data Processing Unit
31 . . . Data Collector
32 . . . Data Storage Section
321 . . . Spectral Data Storage Area
322 . . . Optical Image Data Storage Area
33 . . . Image Creator
34 . . . Image Alignment Processor
35 . . . Regression Analysis Executer
36 . . . Regression Model Memory
37 . . . Predicted Image Creation Calculator
38 . . . Display Processor
4 . . . Input Unit
5 . . . Display Unit

The invention claimed is:

1. An imaging analysis device comprising:
a computer; and
software configured to cause the computer to:
perform analysis by a predetermined analysis method for each of a plurality of measurement points set in a measurement area on a sample and collect imaging data;
acquire a reference image for the measurement area;
with respect to the imaging data and the reference image obtained for the same sample, perform predetermined regression analysis calculation with the imaging data as an explanatory variable and data constituting the reference image as a target variable and acquire a regression model; and
apply, to the regression model, the collected imaging data using a second sample different from the sample, and create a predicted image based on a pseudo regression analysis result.

2. The imaging analysis device according to claim 1, wherein the analysis method is mass spectrometry, and the imaging data is mass spectral data in a predetermined mass-to-charge ratio range obtained for each of the measurement points.

3. The imaging analysis device according to claim 1, wherein the analysis method is Raman spectroscopy or infrared spectroscopy, and the imaging data is spectral data in a predetermined wavelength range or wavenumber range obtained for each of the measurement points.

4. The imaging analysis device according to claim 1, wherein the regression analysis is a partial least squares regression analysis.

5. An imaging data analysis method comprising:

an analysis execution step for performing analysis by a predetermined analysis method for each of a plurality of measurement points set in a measurement area on a sample and collecting imaging data;

a reference image acquisition step for acquiring a reference image for the measurement area;

a regression analysis execution step for, with respect to the imaging data and the reference image obtained for the same sample, performing predetermined regression analysis calculation with the imaging data as an explanatory variable and data constituting the reference image as a target variable and acquiring a regression model; and a predicted image creation step for applying, to the regression model, imaging data obtained by the analysis execution step using a second sample different from the sample used at a time of execution of the regression analysis in the regression analysis execution step, and creating a predicted image based on a pseudo regression analysis result.

6. The imaging data analysis method according to claim 5, wherein the analysis method is mass spectrometry, and the imaging data is mass spectral data in a predetermined mass-to-charge ratio range obtained for each of the measurement points.

7. The imaging data analysis method according to claim 5, wherein the analysis method is Raman spectroscopy or infrared spectroscopy, and the imaging data is spectral data in a predetermined wavelength range or wavenumber range obtained for each of the measurement points.

8. The imaging data analysis method according to claim 5, wherein the regression analysis is a partial least squares regression analysis.

* * * * *